Aug. 25, 1953 A. W. RUSSELL 2,649,903
FOREHEARTH BURNER BLOCK
Filed May 17, 1949 2 Sheets-Sheet 1
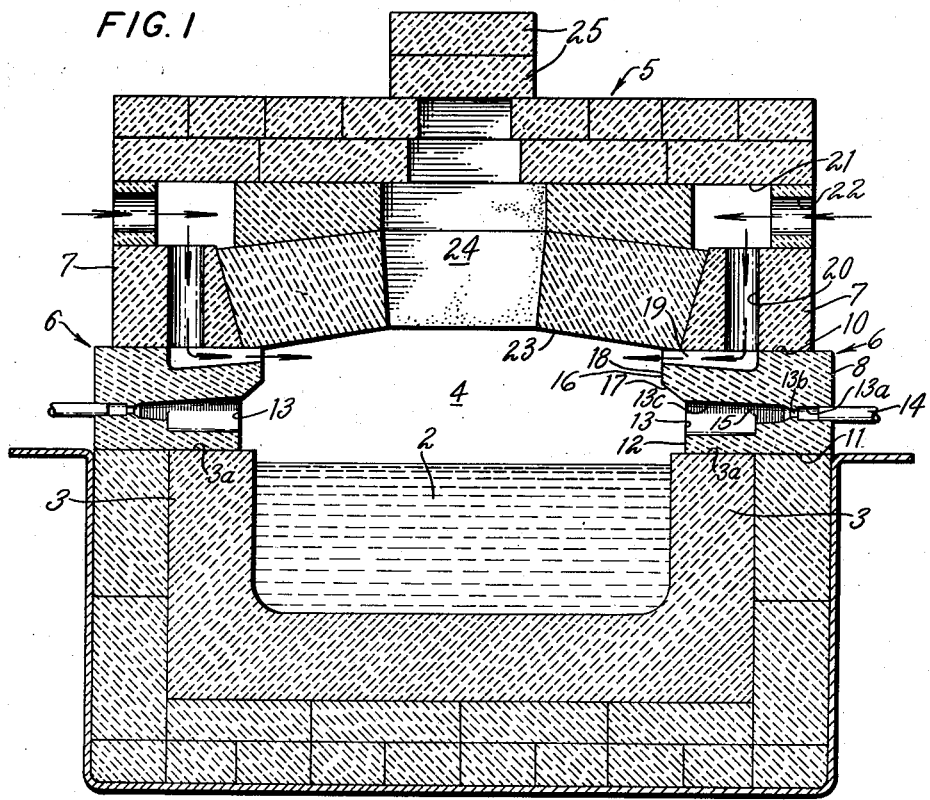
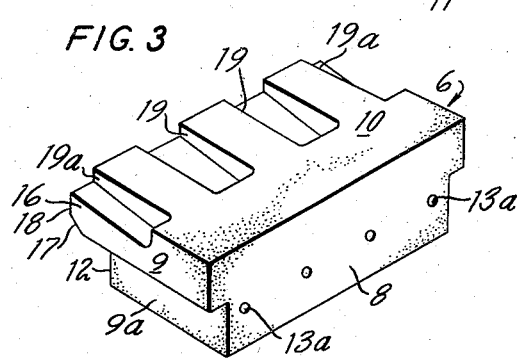
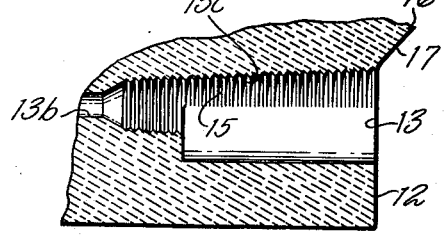
INVENTOR
ALAN W. RUSSELL
BY Parham + Bates
ATTORNEYS Aug. 25, 1953 — A. W. RUSSELL — 2,649,903
FOREHEARTH BURNER BLOCK
Filed May 17, 1949 — 2 Sheets-Sheet 2

INVENTOR
ALAN W. RUSSELL
BY Parham + Bates
ATTORNEYS

Patented Aug. 25, 1953

2,649,903

UNITED STATES PATENT OFFICE 2,649,903

FOREHEARTH BURNER BLOCK

Alan W. Russell, Wethersfield, Conn., assignor to Emhart Manufacturing Company, a corporation of Delaware Application May 17, 1949, Serial No. 93,727

3 Claims. (Cl. 158—7)

This invention relates to improvements in burner blocks and more particularly to a burner block of novel form and advantageous characteristics which is adapted to be incorporated in a side wall of a glass feeder forehearth.

An object of the invention is to provide a feeder forehearth side wall burner block having a high efficiency in the heating of glass in a forehearth structure in which the burner block is incorporated.

A further object of the invention is to provide a feeder forehearth side wall burner block which is formed to provide at its inner side above the level of burner ports therein an overhanging integral portion having a highly efficient inclined surface radiating and reflecting heat to and receiving it from the glass and the surrounding refractories in the adjacent portion of the forehearth.

A further object of the invention is to provide a burner block for a feeder forehearth side wall which is of sufficient thickness or vertical extent to extend vertically from the top of the side wall of the glass containing channel structure of the forehearth at least to the inner roof line of the forehearth when such roof line is spaced above the side wall of the channel structure sufficiently to provide an adequate space above the glass in the forehearth for glass temperature regulating media, the block also being of relatively great length so that a row of spaced burner ports may be provided therein at a level intermediate the height of the burner block and an inclined heat radiating surface may be provided above the level of the burner ports extending the full length of the block and in heat radiating and reflecting relation to the glass in the forehearth, whereby to assure a heating action of high efficiency and desirable uniformity on the adjacent portion of the glass stream in the forehearth.

A still further object of the invention is to provide a refractory burner block for a feeder forehearth side wall which is relatively strong and durable and well adapted to have a long life in the service for which intended.

A still further object of the invention is to provide a refractory burner block for a feeder forehearth side wall which is formed with burner ports therein at a suitable level for use in heating glass in a forehearth structure containing the block and also with other passages therein at a higher level and suitable for use to apply a cooling fluid to the interior of the forehearth beneath the roof structure thereof.

Other objects and advantages of the invention hereinafter will be pointed out or will become apparent from the following description of two illustrative examples of burner blocks embodying the invention, as shown in the accompanying drawings, in which Fig. 1 is a transverse vertical section through a portion of a forehearth having opposite side walls and in which burner blocks formed according to the present invention are provided;

Fig. 2 is an inner face view of one of the burner blocks shown in Fig. 1;

Fig. 3 is a perspective view of the block, looking toward an outer corner portion thereof;

Fig. 4 is a relatively enlarged fragmentary vertical section through a burner port in the block;

Figure 5:
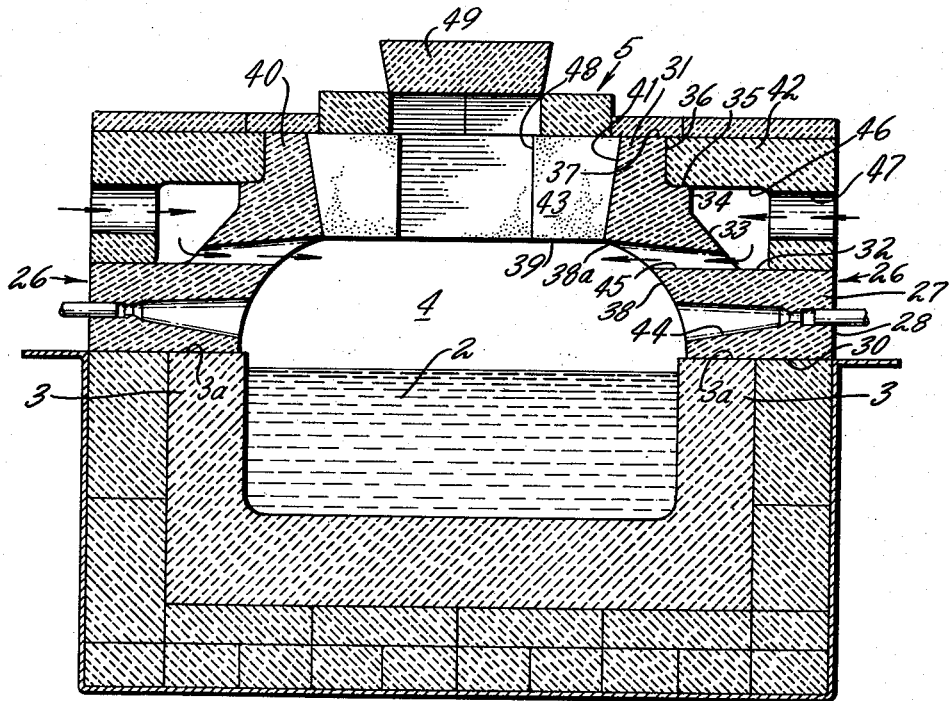
Fig. 5 is a view like Fig. 1, but showing burner blocks of the invention of a different form as incorporated in the opposite side walls of a forehearth.

A forehearth in which burner blocks of the invention may be used is shown in Fig. 1 as comprising a channel structure 1 which is generally of U-shape in cross-section and is adapted to accommodate a stream 2 of molten glass of substantial depth between side walls 3 thereof. The forehearth channel may be conventional as to details of construction, manner of support, etc., and hence need not be further described.

The glass stream 2 is shown as filling the forehearth channel to a level slightly below that of the plane of the top surfaces 3a of the channel structure side walls, as is usual in the operation of such a forehearth. In such a forehearth, a space 4 of substantial area in vertical section is provided above the glass stream beneath a forehearth roof structure, generally designated 5, which is spaced above the top surfaces 3a of the channel structure side walls by suitable side wall blocks. In a forehearth to which burner blocks of the present invention in the form shown in Fig. 1 have been applied, this spacing is accomplished in a section of the forehearth to which heat is to be applied by the interposition of burner blocks embodying the invention and generally designated 6 between the top surfaces 3a of the channel structure side walls and the supported blocks 7 at the base of the roof structure, which may be arched more or less as shown.

As shown by Figs. 2 and 3, the burner block 6 is formed as an integral one-piece body of refractory material having a substantially rectangular vertical outer side face 8, Figs. 1 and 3, parallel end faces 9, Figs. 2 and 3, perpendicular to the outer side face 8, and parallel upper and lower faces 10 and 11, respectively, Figs. 1 and 2, perpendicular to the outer side face 8 and also to the end faces 9. In other words, the refractory burner block 6 in overall form is generally of rectangular shape, although it departs therefrom at places and in particulars hereinafter to be particularly pointed out.

The inner side face of the block body is substantially vertical and parallel to the outer side face from the lower surface of the block for approximately half the height thereof as indicated at 12 in Figs. 1 and 2. This is the portion of the block which contains burner ports, designated 13, which extend completely through the block from its outer side face to the inner side face thereof and are spaced apart longitudinally of the block, varying in number according to the length of the block and to the spacing between adjacent burner ports. In the example shown, the block has four of the burner ports 13. Each of these ports has an outer end portion 13a of appropriate size to closely fit the inserted end of a fuel pipe or nozzle 14, a relatively constricted portion 13b in advance of the fuel pipe accommodating portion 13a and an enlarging generally frusto-conical portion 13c extending from the constricted portion 13b through the remainder and major part of the width of the block to the inner side thereof. The wall of the portion 13c of the burner port may be corrugated or otherwise roughened as indicated at 15, Figs. 1 and 4, to aid in securing combustion of the fuel to the desired extent in the port and for a desirable heat radiating effect from the port.

The portion of the burner block body above the level of the discharge ends of the burner ports at the inner side of the block projects beyond such burner ports as indicated at 16 and as best seen in Fig. 1 so as to overhang the subjacent portion of the forehearth space 4. The face of this projecting upper portion 16 of the burner block is inclined as indicated at 17 upwardly and inwardly beyond the plane of the inner face of the lower portion of the burner block for at least part of the distance from the level of the upper part of the discharge ends of the burner ports to the upper face 10 of the burner block. This inclined face 17 thus is turned obliquely downward toward the surface of the glass stream 2 between the side wall of the channel structure supporting the burner block and the longitudinal median line of the glass stream. The remainder of the inner side face of the upper portion of the burner block body may be substantially vertical, as indicated at 18. The inclined portion of the inner face of the upper portion of the block body might extend for a greater part of its vertical extent or for even the full height thereof. It provides an efficient heat radiating surface when the burner block is in use.

The upper portion of the burner block body may be formed appropriately to admit cooling fluid to the forehearth space next to its roof structure if this is desired when the block is in a position for use. For this purpose the particular block body has two full width channels 19 in its top surface, spaced apart and flanked by half channels 19a also in its top surface but at the end edges thereof. All of these channels are open at the inner side of the block but may terminate short of the opposite outer side thereof, as shown. When the block 6 has been incorporated in a forehearth side wall structure as shown in Fig. 1 and other like blocks, not shown, are positioned at its opposite ends, the half channels at the meeting ends of adjacent such blocks will form full width channels and all channels will be covered by components of the roof structure except at places where the lower ends of vertical passages 20 in roof blocks 7 open thereinto as shown for one channel and one vertical passage at each of opposite sides of the forehearth section shown in Fig. 1. The vertical passages 20 lead from cooling air chambers 21 in the roof structure, each such chamber being provided with an air inlet 22 through which cooling air under pressure may be supplied by suitable known means, none being shown. The channels in the top of the burner block thus co-act with adjacent structural elements of the forehearth assembly to serve as cooling air ports of a cooling system through which cooling air may be directed, as indicated by the direction arrows in Fig. 1, into the upper part of the forehearth space 4 so as to scrub against the inner surface 23 of the adjacent part of the roof structure in passing transversely thereof to a vertical outlet opening 24 in the middle part of the roof structure. The outlet 24 may be controlled by removable closure or damper blocks 25 in a known manner. The channel and half channel bottoms may be upwardly inclined toward their discharge ends as shown.

The number and relative spacing of cooling channels in a block 6 may be predetermined and vary according to the length of the block and the service for which intended. Only full width or half width channels may be provided or the block may be provided without any such channels if it is to be used only in a structure in which heating only is to be effected by use of the block. Also, burner blocks 6 intended for right and left hand forehearth side walls, respectively, may have their cooling air channels differently arranged so that the channels of directly opposite such blocks will be located in disaligned or staggered relative positions in a forehearth. This will provide more even and efficient cooling in the forehearth channel.

Provision of the cooling channels in the burner block permits relative spacing of the individual cooling channels in relation to each other and to the individual burner ports so that there is adequate refractory material of the block body between each burner port and the nearest cooling channel with a minimum of such refractory material required in a block body of sufficient height to extend at least to the roof line of a forehearth in which the block is used. This makes for economy of material used as the height of the integrally formed block body having both burner and suitably located cooling ports and used in lieu of a considerable number of smaller blocks as heretofore may be less than the overall height of the assembly of the smaller blocks. The height of the space above the glass in the forehearth channel therefore may be less than when the smaller blocks are used and this in turn makes for economy in the fuel required for operation of the forehearth.

The overhanging upper portion of the block body will be heated to a high temperature, particularly at the inclined face 17 thereof, when the block has been installed in a forehearth side wall and is in use. Radiation of heat from this unbroken inclined surface extending the full length of the block into the glass stream is importantly advantageous in effecting desirable heating of the glass stream in the forehearth channel. The highly efficient heating action may be combined with a desirable cooling action by introduction of cooling air through the cooling channels in the top of the block directly underneath the roof structure.

A peep hole may be provided at one or each end of the burner block in use by forming it with a transverse notch 9a in either or each of its end faces if desired. These notches may, of course, be omitted.

The block is of relatively large size in contrast to burner blocks customarily used heretofore in feeder forehearth side wall structures and thus obviates need for numerous additional refractory elements heretofore used to supplement the usual burner blocks in building up glass feeder forehearth side walls. This makes for simplicity and ruggedness of side wall structures.

Figure 6:
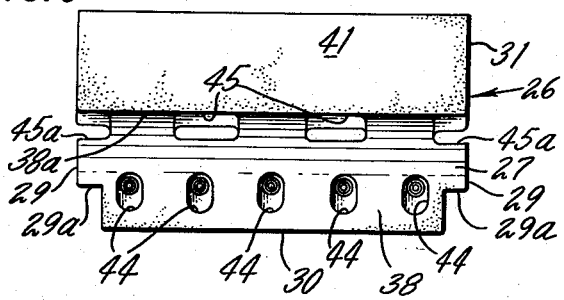
Fig. 6 is an inner face view of one of the burner blocks shown in Fig. 5.
Figure 7:
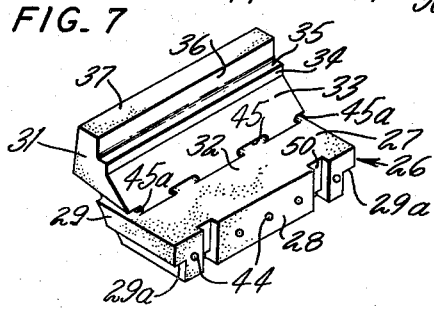
Fig. 7 is a perspective view of the block, looking at an outer corner portion thereof.

A second form of burner block, shown in Figs. 5, 6 and 7, embodies the same concept of adequate provision for efficient heating by radiation from an overhanging inclined inner side face of the block above the level of the burner ports together with input of cooling air underneath the forehearth roof, as desired. This second form of block is different in particulars which will now be pointed out.

The burner blocks shown on the tops 3a of the side walls 3 of the channel structure 1 of the forehearth shown in Fig. 5 are generally designated 26. Each comprises a generally rectangular body portion 27 having a vertical outer side face 28, parallel end faces 29 provided with peep hole notches 29a in their lower portions, and a horizontal lower surface 30, Figs. 5 and 6. The burner block 26 is formed with an integral upward extension 31 of the full length of the body portion 27 but extending thereon only part way from its inner side face to its outer side face and projecting beyond the inner side face of the block body portion 27. See Figs. 5 and 7. The upper face of the block 26 thus comprises a relatively low substantially horizontal rear portion 32 which merges into an upwardly and inwardly inclined portion 33 at the rear of the lower part of the extension 31. This inclined surface is merged by a vertical surface 34 into a narrow horizontal surface 35, the latter in turn being merged by a vertical surface 36 into a horizontal surface 37 at the top of the integral extension 31. At its inner side, the block body portion 27 is formed with a side face 38, Figs. 5 and 6, of a generally upwardly inclined character, such face being curved along an arc having a radius of relatively great length. This face 38 may continue along the same angle of inclination and arcuate curvature as an inner side face indicated at 38a of the projecting portion of the integral upward extension 31 that will be located below the lower line 39 of a roof structure 40 of a forehearth having a side wall in which the block 26 has been installed. See Fig. 5. The inner side face of the upward extension 31 of the burner block may be slightly inclined outwardly above such roof line, as indicated at 41. The upward extension on the burner block body portion 27 is suitably shaped and dimensioned to be incorporated in the actual forehearth roof structure in which it fits between and meshes with suitably shaped and positioned blocks 42 and 43, respectively.

The body portion 27 of the burner block is provided with burner ports 44. Cooling channels 45 and half width channels 45a may be provided in the block at the junction of the body portion 27 and the upward extension 31 thereof and may be upwardly inclined toward their discharge ends. These may be supplied with cooling air from a cooling chamber 46 in the roof structure, such cooling air being supplied thereto through an inlet port 47. Introduction of cooling fluid through the cooling system thus provided into the forehearth against the under surface of the roof structure thus may occur as indicated by the direction arrows in Fig. 5. The roof structure may be provided with an outlet 48 controlled by damper blocks such as that indicated at 49. Vertical notches as indicated at 50, Fig. 7, may be provided in the outer side of the block body portion 27 to accommodate associate structural elements, not shown.

The operation of this form of the burner block is substantially the same as in the case of the first form. The inclined face 38, 38a of the overhanging portion of the burner block above the level of the burner ports looks at the surface of the glass stream 2 and is an efficient heat radiator.

I claim:

1. A burner block for a glass feeder forehearth wall, having a body of refractory material of substantial length, height and width between opposite side faces thereof, said faces respectively being adapted to be disposed at the outer and inner sides of a forehearth wall containing the block, said block having a plurality of spaced, parallel burner ports extending through the body thereof approximately intermediate its height with the discharge ends of said ports located in the inner side face of the block body, said block body having a relatively projecting portion at its inner side face located above the level of the discharge ends of said burner ports and having an upwardly inclined surface facing in a direction extending obliquely downward past the discharge ends of said burner ports so as to be adapted to be heated from the ports and to radiate heat downwardly and away from the inner side of the body of the block, said upwardly inclined surface having a vertical extent equal to at least a substantial part of the vertical extent of the portion of the block body overlying said ports, said block also being formed with spaced parallel channels in its body opening through the inner side thereof at a level spaced above that of the burner ports and adapted when the block is cooperatively associated with other blocks in a side wall of the forehearth having a roof structure to receive and direct streams of cooling fluid from the block at the inner side thereof against the under surface of the roof structure.

2. A burner block as defined by claim 1 wherein the bottoms of said channel are upwardly inclined toward their delivery ends at the inner side of the block so as to give an upward component to the streams of cooling fluid discharged therefrom.

3. A burner block for a glass feeder forehearth wall, said block being made of refractory material and having opposite side faces respectively adapted to be disposed at the outer and inner sides of a forehearth wall containing the block, said block having a burner port extending through a portion thereof approximately intermediate its height with the discharge end of said port located in the inner side face of the block, said block being provided with a relatively projecting portion at its inner side face located above the level of the discharge end of said burner port and having an upwardly inclined surface facing in a direction extending obliquely downward past the discharge end of said burner port so as to be adapted to be heated from the port and to radiate heat downwardly away from the inner side of the subjacent portion of the block, said upwardly inclined surface having a vertical extent equal to at least a substantial part of the vertical extent of the portion of the block overlying said port, said block also being provided with a channel opening through the inner side thereof at a level spaced above that of the burner port and adapted when the block is cooperatively associated with other blocks in a side wall of a forehearth having a roof structure to receive and direct cooling fluid from the block at the inner side thereof against the under surface of the roof structure.

ALAN W. RUSSELL.

References Cited in the file of this patent

UNITED STATES PATENTS

| Number | Name | Date |
|---|---|---|
| 339,876 | Graham | Apr. 13, 1886 |
| 1,741,584 | Reintjes | Dec. 31, 1929 |
| 2,144,973 | Honiss | Jan. 24, 1939 |
| 2,278,486 | Quigley et al. | Apr. 7, 1942 |
| 2,313,698 | Schutz | Mar. 9, 1943 |
| 2,422,481 | Grantham | June 17, 1947 |
| 2,511,676 | Morton | June 13, 1950 |

FOREIGN PATENTS

| Number | Country | Date |
|---|---|---|
| 437,351 | Great Britain | Jan. 24, 1934 |